US008484705B2

(12) United States Patent
Hoppe et al.

(10) Patent No.: US 8,484,705 B2
(45) Date of Patent: Jul. 9, 2013

(54) SYSTEM AND METHOD FOR INSTALLING AUTHENTICATION CREDENTIALS ON A REMOTE NETWORK DEVICE

(75) Inventors: Sally Blue Hoppe, Corvallis, OR (US); Jim Harritt, Albany, OR (US); Matt Torres, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1342 days.

(21) Appl. No.: 12/205,700

(22) Filed: Sep. 5, 2008

(65) Prior Publication Data

US 2009/0271851 A1 Oct. 29, 2009

Related U.S. Application Data

(60) Provisional application No. 61/047,978, filed on Apr. 25, 2008.

(51) Int. Cl.

*G06F 7/04* (2006.01)
*G06F 15/16* (2006.01)
*G06F 17/30* (2006.01)
*H04L 29/06* (2006.01)

(52) U.S. Cl.

USPC .......... 726/6

(58) Field of Classification Search

None

See application file for complete search history.

(56) References Cited

U.S. PATENT DOCUMENTS

| | | | | |
|---|---|---|---|---|
| 5,754,763 | A | 5/1998 | Bereiter | |
| 6,012,088 | A | 1/2000 | Li et al. | |
| 6,532,543 | B1 | 3/2003 | Smith et al. | |
| 6,918,038 | B1 | 7/2005 | Smith et al. | |
| 7,010,690 | B1 | 3/2006 | Hanna et al. | |
| 7,127,524 | B1 * | 10/2006 | Renda et al. | 709/245 |
| 7,143,287 | B2 | 11/2006 | Bade et al. | |
| 7,171,555 | B1 | 1/2007 | Salowey et al. | |
| 7,443,834 | B1 * | 10/2008 | Sylvain | 370/352 |
| 7,496,752 | B2 * | 2/2009 | Yamaguchi et al. | 713/156 |
| 2003/0058827 | A1 | 3/2003 | Chow et al. | |
| 2004/0107360 | A1 | 6/2004 | Herrmann et al. | |
| 2004/0107366 | A1 | 6/2004 | Balfanz et al. | |
| 2004/0172559 | A1 | 9/2004 | Luo et al. | |
| 2004/0268140 | A1 | 12/2004 | Zimmer et al. | |
| 2005/0055578 | A1 | 3/2005 | Wright et al. | |
| 2005/0278775 | A1 | 12/2005 | Ross | |
| 2006/0101409 | A1 | 5/2006 | Bemmel | |
| 2006/0112431 | A1 | 5/2006 | Finn et al. | |
| 2006/0161967 | A1 | 7/2006 | Dawson et al. | |
| 2006/0164199 | A1 | 7/2006 | Gilde et al. | |
| 2006/0168648 | A1 | 7/2006 | Vank et al. | |
| 2006/0268856 | A1 | 11/2006 | Voit et al. | |
| 2007/0002899 | A1 * | 1/2007 | Raman et al. | 370/469 |
| 2007/0050839 | A1 | 3/2007 | Dharanikota et al. | |
| 2007/0098178 | A1 | 5/2007 | Raikar | |

(Continued)

*Primary Examiner* — Nadia Khoshnoodi

(57) ABSTRACT

A method for installing authentication credentials on a remote network device. A remote network device without valid authentication credentials may be connected to a port of an authenticating network switch, and the authentication protocols of the port may be enabled. A Network Access Control (NAC) credential service validates the remote network device comparing a received remote device identifier against a previously stored remote device identifier. The received remote device identifier may be received from the remote network device using a network when the remote network device attempts to access a private network. The NAC credential service disables the authentication protocols of the port in response to validating the received remote device identifier. The NAC credential service installs authentication credentials on the remote network device using encrypted data, so an untrusted entity cannot view the authentication credentials.

23 Claims, 3 Drawing Sheets

300

Connecting a remote network device without valid authentication credentials to a port of an authenticating network switch, wherein authentication protocols of the port are enabled. — 310

Validating a first received remote device identifier against a previously stored remote device identifier using a Network Access Control (NAC) credential service, wherein the first remote device identifier is received from the remote network device using a network. — 320

Disabling the authentication protocols of the port using the NAC credential service in response to validating the first remote device identifier. — 330

Installing authentication credentials on the remote network device with the NAC credential service using encrypted data. — 340

U.S. PATENT DOCUMENTS

2007/0220598 A1 9/2007 Salowey et al.
2008/0005798 A1 1/2008 Ross
2008/0016230 A1 1/2008 Holtmanns et al.
2008/0046993 A1 2/2008 Mullick et al.
2008/0288777 A1 * 11/2008 Lai et al. ....................... 713/171

* cited by examiner

SYSTEM AND METHOD FOR INSTALLING AUTHENTICATION CREDENTIALS ON A REMOTE NETWORK DEVICE

CROSS-REFERENCE TO RELATED APPLICATIONS

This Application claims the benefit of U.S. Provisional patent application Ser. No. 61/047,978, filed Apr. 25, 2008, which is hereby incorporated by reference in it's entirety.

BACKGROUND

In the past, video conferencing devices have been connected to a private network with a Video Management System (VMS) by technicians or network (system) administrators employed by the owners of the private network or by local Information Technology (IT) professionals employed by the user of the video conferencing devices. Video conferencing devices may provide authentication credentials to the private network in order to get access to the private network (e.g., the video network). Installers of the credentials may view the authentication credentials in order to install the credentials on the local video conferencing device.

Allowing a local IT professional or user to view the authentication credentials may allow this untrusted entity or person to have unauthorized access to an otherwise secure private network. Since the credentials may not be tied to a specific device, this may allow the credentials to be used or misused by the local IT professional for purposes adverse to the purpose and security of the private network. There are numerous ways authentication credentials which are viewable by a local IT professional or user can be used jeopardize the privacy and security of the private network.

Furthermore, the private network administrators can have difficulty installing the credentials remotely without a local IT professional because the video conferencing devices may not be accessible remotely since the devices are remote and are not currently on the private network.

Some prior solutions for installing credentials include installing Network Access Control (NAC) credentials (authentication credentials) via remote connections, web interfaces, telnet, Secure Shell (SSH), or dataports. These methods use authentication credentials (e.g., 802.1x credentials) that are accessible by local IT professionals.

DETAILED DESCRIPTION

Figure 1:
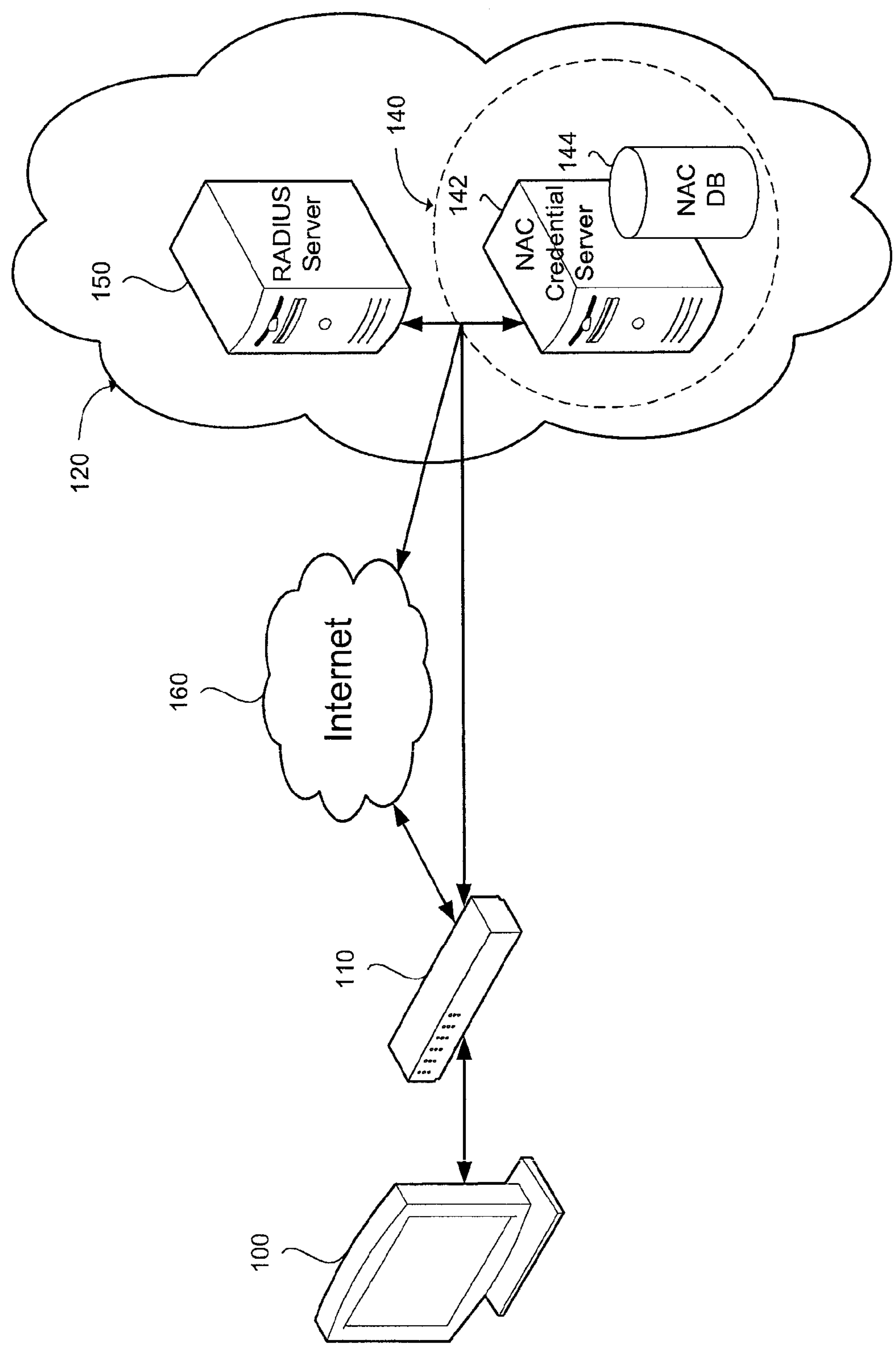
FIG. 1 is an illustration of a remote network device and authenticating network switch used for installing authentication credentials in accordance with an embodiment.

Alterations and further modifications of the inventive features illustrated herein, and additional applications of the principles of the inventions as illustrated herein, which would occur to one skilled in the relevant art and having possession of this disclosure, are to be considered within the scope of the invention. The same reference numerals in different drawings represent the same element, and thus their descriptions may not be repeated.

Local IT professionals working with a video conferencing device should not have direct access to the authentication credentials used for gaining access to private network, as the credentials allow direct access to the private network. Network Access Control (NAC) credentials should be installed in a secure manner and the credentials should not be visible from the device anytime before or after the credentials are installed.

The technicians and network administrators working for the owners of the VMS private network are generally considered to be trusted entities, because they are employed to protect the interests of the private network and the company managing the network. The local IT professionals or users of the video conferencing devices or endpoint devices are generally considered to be untrusted entities, because they do not have similar accountability to protect and keep the private network secure.

The present system and method can remotely configure video conferencing devices with authentication credentials in a secure manner. The system and method may use an untrusted entity to connect the video conferencing device to the private network via the Internet or directly through a Wide Area Network (WAN), without allowing the untrusted entity to view the authentication credentials. FIG. 1 provides an illustration of the connection of the video conferencing device 100 to a private network 120 providing video conferencing services. The private network may include a RADIUS server, a NAC credential service, and a video management system (VMS) 200.

A remote network device 100 may be a remote device, an endpoint (EP), a remote video conferencing device, a hardware appliance, an audio-visual device used for video conferencing, or a camera with a monitor. In order to use a remote network device to video conference with another video conferencing device over a network, a video management system (VMS) 200 may be used to manage the connection and interchange of information and data between the devices. Video management systems may be administered by a third party's private network, which may be separate and distinct (separated by a firewall) from the private networks of the users of the video conferencing devices. The user's private network and the VMS's private network may be connected together by a larger network, such as the Internet.

Figure 2:
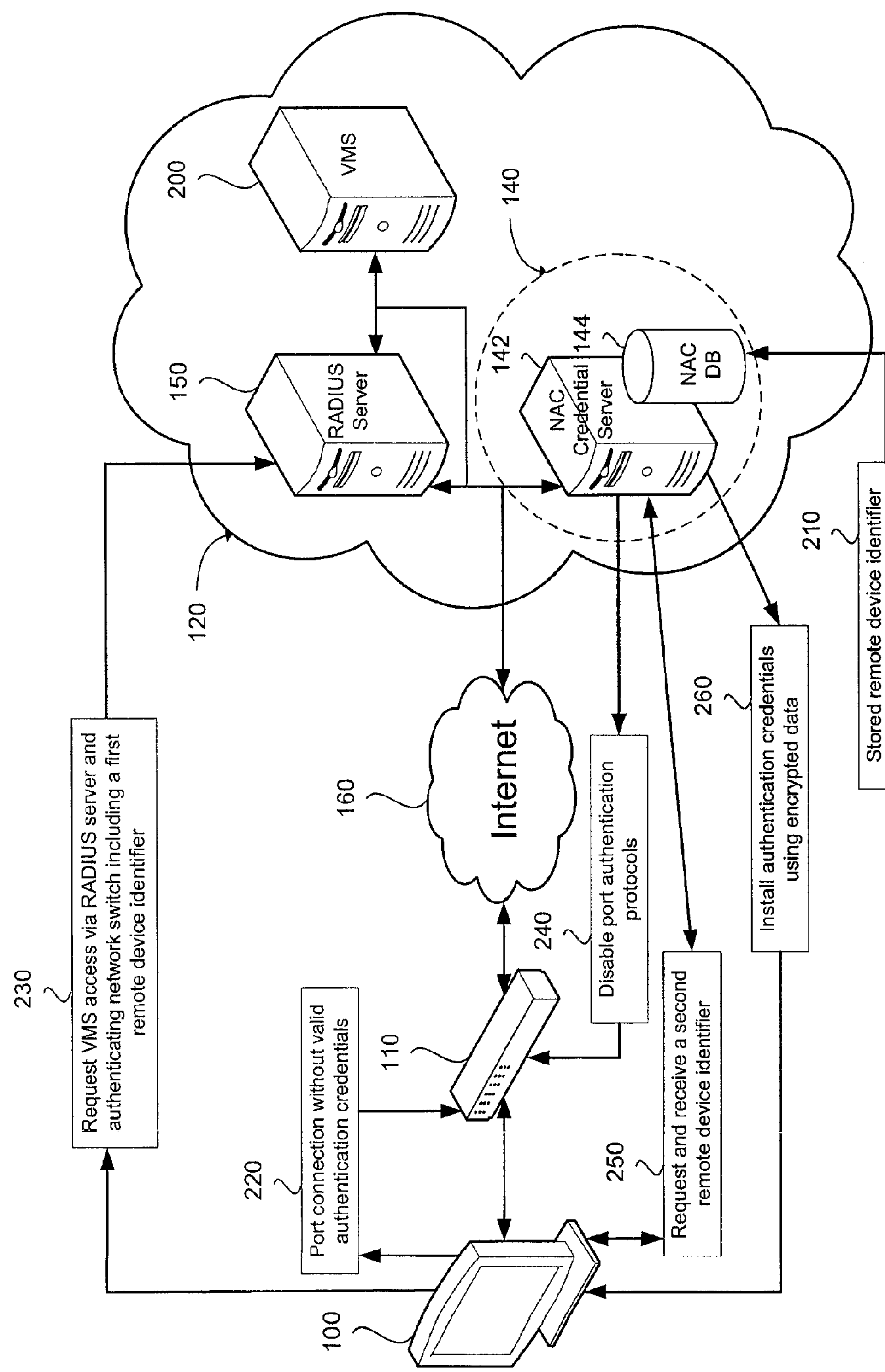
FIG. 2 is an illustration of a method for installing authentication credentials on a remote network device using an authenticating network switch in accordance with an embodiment.

In order to maintain the security and privacy of the video conference and a video management system (VMS) 200, the private network 120 of the VMS may use port-based network access control as a means to access the private network, as illustrated in FIG. 2. Port-based network access control can use a Remote Authentication Dial-In User Service (RADIUS) server 150 in conjunction with an authenticating network switch 110 to authenticate the identity of a remote network device (video conferencing device) 100 for use on the private network or VMS, as shown in FIG. 1. The authenticating network switch may have ports to provide the remote network device with a connection to a Local Area Network (LAN) and an external network 160 (e.g., the Internet). In another embodiment of the authenticating network switch may have ports to provide the remote network device with a private connection directly to a private network, also shown in FIG. 1. The ports of the authenticating network switch may be enabled to use authentication protocols so the remote network device may access the VMS or the private network via RADIUS server using valid authentication credentials stored on the video conferencing device. A video conferencing device initially may not have valid authentication credentials installed on the device. Valid credentials may be a user name and password. The user name and password may not be assigned to a particular remote network device. The present system and method may assist a user and the private network administrator in securely installing these authentication credentials installed on the remote network device, so a user cannot view the credentials before, during, or after installation.

Using port-based network access control can provide secure and encrypted communication to the VMS using the protocols of the authenticating network switch. The port may be enabled to set authentication protocols so communication with the VMS or the private network can occur after the remote device successfully logs into the RADIUS server. Until the remote network device has been authenticated by the RADIUS server, the authentication protocols of the enabled port may only respond to communication from a remote network device allowing for the submission of authentication credentials. For example, the system and method may use a Procurve Switch as the authenticating switch. The authentication protocols may use an Institute of Electrical & Electronics Engineers (IEEE) 802.1x standard or protocol, and the authenticating network switch may be enabled to use 802.1x authentication protocols. A port's authentication protocols may be normally enabled on the switch, so only data conforming to 802.1x authentication protocols may be transmitted to a private network. Other port-based network access control standards and protocols may also be used.

Three distinct roles existing within a port-based network access control interaction are: Authenticator, supplicant, and authentication server. The authenticator is the port that wishes to enforce authentication before allowing access to services that are accessible via that port. The supplicant is the device or system wishing to access the services via that port. The authentication server performs the authentication function necessary to check the credentials of the supplicant on behalf of the authenticator and authorizes the supplicant to use the authenticator's services via the authenticator's port. The ports on the authenticating network switch may adopt the role of the authenticator. The remote network device (video conferencing device) may adopt the role of the supplicant. The RADIUS server may adopt the role of the authentication server in the port-based network access control interaction.

The RADIUS server may block all communication to the private network, except communication involving authentication of authentication credentials of the remote network device via the port. After the remote network device provides proper authentication credential to the RADIUS server, the remote network device may be able to access the other parts of the private network, such as the VMS. Utilizing the VMS allows the remote network device to connect with any other video conferencing devices coupled to the VMS via the network or Internet.

The VMS may allow a user to use any off-the-shelf video conferencing device enabled to use the communication protocols supported by the VMS. The video conferencing device may also be enabled to store authentication credentials in an encrypted format.

The present system and method allows a remote network device without valid authentication credentials to obtain valid credentials, while the user or local IT professional is unable to view the authentication credentials. A user may obtain or purchase a video conferencing service which allows a video conferencing device (remote network device) to access a VMS. At a time when a user is obtaining or purchasing the video conferencing service or sometime after the purchase, a user may provide the private network administrator, company representative, or website data-entry form (all trusted entities of the VMS private network) with device specific information about the remote network device that the user will connect to the VMS. A facsimile, telephone, or other means may then be used by a user or IT professional to provide the trusted entity with device specific information.

The trusted entity (a person or electronic mechanism) may electronically enter 210 the device specific information (stored remote device identifier or previously stored remote device identifier) which is then stored in a database 144 or other means for electronic retrieval of information, as shown in FIG. 2. The stored remote device identifier may be used later in the process as a basis to compare remote device identifier information sent by the remote network device. The database may store a plurality of stored remote device identifiers and may be included in a Network Access Control (NAC) credential service 140. The NAC credential service manages the process of installing authentication credentials on the remote network device. For example, the Network Access Control credential service may use Cisco's Network Admission Control protocols. The NAC credential service may include a server 142, a database 144, firmware, a processing unit, and software necessary to manage the process of installing authentication credentials on the remote network device. The NAC credential service may be included as part of the RADIUS server. The RADIUS server may be included as part of the VMS. In another embodiment of the VMS, the RADIUS server, and the NAC credential service are separate server systems that may communicate with each other.

As part of the process of storing the stored remote device identifier, the NAC credential service may also create a user account for the remote network device and valid authentication credentials to be installed on that remote network device. The NAC credential service may transmit the valid authentication credentials to the RADIUS server or VMS to be stored on the RADIUS server or VMS, respectively. In another embodiment, a user account for the remote network device and valid authentication credentials to be installed on that remote network device may be created on the RADIUS server, and replicated to the NAC credential service or VMS. The authentication credentials may be created by a network administrator or the credentials may be automatically generated by the NAC credential service, RADIUS server, the VMS, or other component of the private network. The authentication credentials may be randomly generated.

A user may connect 220 the remote network device to the networking switch capable of providing authentication protocols (e.g., 802.1x authentication) without valid authentication credentials stored on the device. The connection may be made using an Ethernet cable, a RG-45 cable, CAT5 cable, wireless connection, or other means utilized to connect a device to a network.

The remote network device may request 230 VMS access via a RADIUS server 150 and the authenticating network switch 110. Because the ports may be set to 802.1x authentication, the port authenticator may attempt to authenticate the remote network device supplicant with the RADIUS authenticating server. The remote network device may fail to gain access to the private network, because the remote network device does not have valid authentication credentials. The RADIUS server may prevent or block the remote network device from having access to the rest of the private network or the VMS.

As part of the authentication protocol, the authenticating server (RADIUS server) may obtain device specific information. Additionally, the RADIUS server may log that an attempt was made and denied and track the device specific information (first remote device identifier) associated with the attempt. Device specific information may include a Media Access Control (MAC) address, an Internet Protocol (IP) address, a subnet mask, a gateway address, a H.323 identifier, a serial number, a model number, a device type, hardware configuration, or combination of these identifiers.

The NAC credential service may scan the logs of the RADIUS server and identify the devices making authentication attempts that were denied access. The NAC credential service may extract the first remote device identifier from the logs and compare the first remote device identifier with the listing of previously store remote device identifiers on the database. When the first remote device identifier matches a previously stored remote device identifier, the first remote device identifier is validated and the NAC credential service continues the process of installing authentication credentials on the remote network device. Security risks to the private network are minimized by validating the first remote device identifier against the previously stored remote device identifier, because the private network is expecting the remote network device without valid authentication credentials.

In another embodiment, the NAC credential service may monitor the communication of the RADIUS server with remote network devices and track the specific device information (first remote device identifier) in real-time as the authentication failure is being generated. The first remote device identifier may be compared with the listing of the previously stored remote device identifiers on the database, and when the first remote device identifier matches the previously stored remote device identifier, the NAC credential service continues the process of installing authentication credentials on the remote network device. Tracking the communication between the RADIUS server and the remote network device may comprise the step of determining an authentication failure.

The NAC credential service may configure the switch to disable 240 the authentication protocols of the specified port connected to the remote network device in response to validating the first remote device identifier. The NAC credential service may disable the authentication protocols by issuing a command communicated to the switch directly, or the NAC credential service may instruct the RADIUS server to disable the authentication protocols of the specified port. As a result, the remote network device is enabled to access the private network using an open port. The NAC credential service may then be notified that the port has its authentication protocols disabled. A switch monitoring process or service may provide the notification of the port with disabled authentication protocols.

The NAC credential service may also monitor the specified port of the remote network device for communication disruptions. A communication disruption may occur when a single exchange of information takes longer than a pre-determined time, or information received from the remote network device does not use a specified format. Because the video conferencing device (remote network device) may use a communication protocol that differs from a typical computer, the video conferencing device protocols may provide another layer of security to ensure the NAC credential service is installing credentials on the video conferencing device, and not a personal computer. The NAC credential service may: Close the port connected to the remote network device, re-enable authentication protocols on the port, terminate the procedure of installing authentication credentials, alert a private network administrator, or a combination thereof when a communication disruption occurs. The NAC credential service may automatically re-enable authentication protocols on the port when a pre-determined maximum time for installing the authentication credentials has been exceeded. This pre-determined maximum time for the procedure may be a few minutes (e.g., 3-10 minutes). All network connection to the private network may be re-authenticated if the pre-determined maximum time for installing the authentication credentials has been exceeded.

The NAC credential service may request 250 device specific information directly from the remote network device via the network 160. The remote network device may provide the NAC credential service a second remote device identifier. The second remote device identifier may be compared and validated against the listing of previously stored remote device identifiers stored in the NAC credential service database. The second remote device identifier may be device specific information (e.g., MAC address) similar to the first remote device identifier, or may contain additional information not provided as part of the authentication interchange between the RADIUS server and remote network device. The request for device specific information and the second remote device identifier may use encryption methods known in the arts (e.g., secure shell).

The NAC credential service may install 260 authentication credentials to the remote network device using encrypted data, and the installation occurs after the NAC credential service has validated the second remote device identifier. The authentication credentials may be transmitted and stored on the remote network device using encrypted data. The encrypted data can prevent a user from viewing the authentication credentials. The encryption may utilize device specific information so the authentication credentials cannot be used on another device. The authentication credentials may be stored in an area or storage location of the remote network device that is inaccessible to a user or local IT professional. The authentication credentials may be a user name, password, or any other information used in authentication. A VMS IP address may also be installed when the credentials are installed. The encrypted data may use secure shell (SSH), Secure State Processing (SSP), Hypertext Transfer Protocol Secure (HTTPS or HTTP over Secure Socket Layer), or other encryption protocols.

The NAC credential service may verify or validate the installation of authentication credentials, after the authentication credentials have been installed to ensure the installation was complete. If the authentication credentials were not properly installed, the NAC credential service may re-install the credentials, alert an administrator of the private network of the failed installation, close the port connected to the remote network device, re-enable authentication protocols on the port, terminate the procedure of installing authentication credentials, or perform a combination thereof. In addition, all connections to the private network or VMS may be re-authenticated to ensure only devices with valid authentication credentials are given access to the private network or VMS, respectively.

The NAC credential service may reboot the remote network device. Rebooting the remote network device may cause the remote network device to use the authentication protocols, so open port communication is no longer used.

The NAC credential service may also re-enable authentication protocols on the port of the authenticating network switch. The NAC credential service may re-enable the authentication protocols by issuing a direct command to the switch, or the NAC credential service may instruct the RADIUS server to re-enable the authentication protocols of the specified port. The NAC credential service may also verify the authentication protocols of the specified port have been re-enabled.

In another embodiment, re-enabling the authentication protocols may cause the remote network device to reboot, so the remote network device may use authentication protocols. The re-enabling the authentication protocols may cause the remote network device to use authentication protocols of the port without rebooting the remote network device.

After the authentication credentials have been installed on the remote network device the device may be enabled to access the private network and the VMS using port-based network access control (the RADIUS server and authenticating network switch), such as 802.1x authentication. Once a device has authentication credentials the device may be moved to any port of any authenticating network switch and still be able to access the private network.

After the authentication credentials have been installed on the remote network device, the remote network device has permanent credentials and may be managed by the VMS.

Some of the results of the system and method described are that the method can be automated to install NAC credentials (authentication credentials) on video conferencing devices in a secure manner. The method does not require on-site IT professionals to have knowledge of the authentication credentials needed to obtain access to a private network. In addition, security risks to the private network can be minimized by not having the authentication credentials known by unauthorized or untrusted personnel (a user or local IT professional), by keeping the switch port open for a limited time, by validating the request for authentication, and by validating the completion of the configuration process.

The method and system for installing authentication credentials on a remote network device may be implemented using a computer readable medium having executable code embodied on the medium. The computer readable program code may be configured to provide the functions described in the method. The computer readable medium may be a RAM, ROM, EPROM, floppy disc, flash drive, optical drive, magnetic hard drive, or other medium for storing electronic data.

Figure 3:
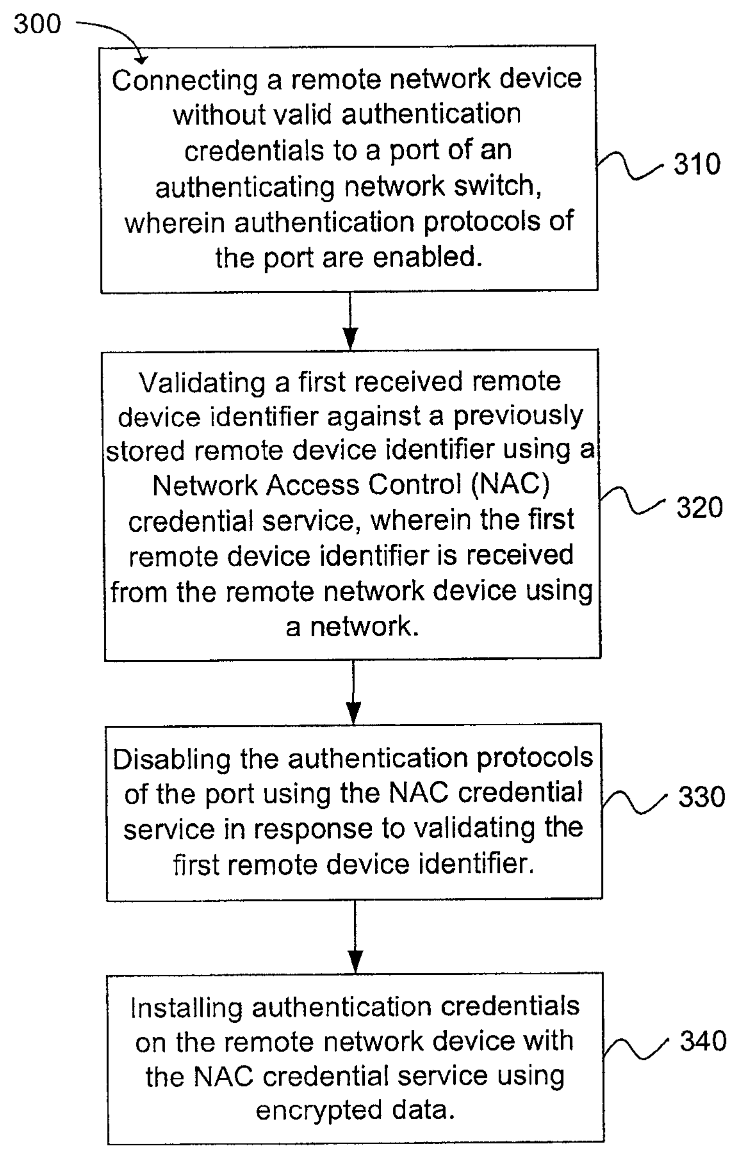
FIG. 3 is a flow chart illustrating a method for installing authentication credentials on a remote network device in accordance with an embodiment.

Another embodiment provides a method 300 for installing authentication credentials on a remote network device, as shown in the flow chart in FIG. 3. The method includes the operation of connecting 310 a remote device without valid authentication credentials to a port of an authenticating network switch, wherein authentication protocols of the port are enabled. The operation of validating 320 a first remote device identifier against a previously stored remote device identifier using a Network Access Control (NAC) credential service follows. The first remote device identifier is received from the remote device using a network.

The method 300 further includes disabling 330 the authentication protocols of the port using the NAC credential service in response to validating the first remote device identifier. After disabling the authentication protocols of the port, the operation of installing 340 authentication credentials on the remote device with the NAC credential service using encrypted data can be performed.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for installing authentication credentials on a remote network device, comprising:

connecting the remote network device with invalid authentication credentials to a port of an authenticating network switch, wherein authentication protocols of the port are enabled;

identifying a failed authentication attempt for the remote network device after an attempt to connect the remote network device to the port of the authentication network switch using the invalid authentication credentials;

monitoring by a Network Access Control (NAC) credential service the failed authentication attempt for a first remote device identifier to determine if the remote network device should be authenticated;

receiving, by the NAC credential service, the first remote device identifier from the remote network device using a network;

validating, by comparing, the first remote device identifier against a listing of previously stored remote device identifiers using the NAC credential service;

disabling the authentication protocols of the port using the NAC credential service in response to validating the first remote device identifier; and installing authentication credentials on the remote network device with the NAC credential service using encrypted data.

2. The method of claim 1, wherein the remote network device is a video conferencing device.

3. The method of claim 1, wherein the authentication protocols use an 802.1x authentication standard and the authenticating network switch is enabled to use 802.1x authentication.

4. The method of claim 1, further comprising determining the failed authentication attempt of the remote network device using a Remote Authentication Dial-In User Service (RADIUS) server after the attempt to connect the remote network device to the port of the authenticating network switch.

5. The method of claim 4, wherein determining the failed authentication attempt of the remote network device using the RADIUS server further comprises logging the failed authentication attempt and the first remote device identifier.

6. The method of claim 1, wherein installing authentication credentials on the remote network device further comprises validating, by comparing, a second remote device identifier with the listing of previously stored remote device identifiers, wherein the second remote device identifier is received in response to a request from the NAC credential service.

7. The method of claim 6, wherein the listing of previously stored remote device identifiers, the first remote device identifier, and the second remote device identifier are selected from the group consisting of a Media Access Control (MAC) address, an Internet Protocol (IP) address, a subnet mask, a gateway address, a serial number, a model number, a device type, and combination thereof.

8. The method of claim 1, further comprising re-enabling the authentication protocols of the port using the NAC credential service after installing authentication credentials on the remote network device.

9. The method of claim 8, wherein re-enabling the authentication protocols of the port occurs after a pre-determined time from disabling the authentication protocols.

10. The method of claim 1, further comprising rebooting the remote network device after installing authentication credentials on the remote network device, wherein the remote network device is enabled to provide authentication credentials to a Remote Authentication Dial-In User Service (RADIUS) server using the port of the authenticating network switch.

11. The method of claim 1, wherein installing authentication credentials on the remote network device further comprises verifying the installation of the authentication credentials on the remote network device using the NAC credential service.

12. The method of claim 1, wherein the remote network device can use the installed authentication credentials stored on the remote network device to provide authentic credentials on a Remote Authentication Dial-In User Service (RADIUS) server using the port of the authenticating network switch.

13. The method of claim 1, further comprising storing the listing of previously stored remote device identifiers into a NAC credential service database utilized by the NAC credential service prior to validating, by comparing, the first remote device identifier against the listing of previously stored remote device identifiers, wherein the listing of previously stored remote device identifiers is entered by a trusted entity.

14. The method of claim 1, further comprising alerting the NAC credential service when a connection disruption occurs between the remote network device and the port after connecting the remote network device to the port of the authenticating network switch and before installing the authentication credentials on the remote network device.

15. The method of claim 1, further comprising an authenticating server logging the failed authentication attempts, wherein the NAC credential service scans logs of the authenticating server and identifies the remote network devices making authentication attempts that were denied access.

16. The method of claim 15, further comprising the NAC credential service extracting the first remote device identifier from the logs to authenticate the remote network device.

17. The method of claim 1, further comprising the NAC credential service monitoring a communication with the remote network device and tracking the first remote device identifier in real-time as the failed authentication attempt is being generated to authenticate the remote network device.

18. A system for installing authentication credentials on a remote network device, comprising:

- an authenticating network switch with a port, wherein authentication protocols of the port are enabled by default;
- a remote network device in communication with the port of the authenticating network switch; and
- a Network Access Control (NAC) credential service in communication with the authenticating network switch using a network, wherein the NAC credential service is configured to:
  - monitor a failed authentication attempt for a first remote device identifier to determine if the remote network device should be authenticated, wherein the failed authentication attempt occurs after the remote network device connects to the port of the authenticating network switch using invalid credentials;
  - receive, from the first remote network device, the first remote device identifier;
  - validate, by comparing, the first remote device identifier against a listing of previously stored remote device identifiers;
  - disable the authentication protocols of the port; and install authentication credentials on the remote network device using encrypted data.

19. The system of claim 18, further comprising a Remote Authentication Dial-In User Service (RADIUS) server in communication with the authenticating network switch using the network and the NAC credential service, wherein the RADIUS server is configured to authenticate the remote network device using the authentication credentials on the remote network device and to receive the first remote device identifier and the failed authentication attempt of the remote network device.

20. The system of claim 18, wherein the Network Access Control (NAC) credential service is further configured to:

- receive a second remote device identifier in response to a request;
- validate, by comparing, the second remote device identifier against the listing of previously stored remote device identifiers;
- re-enable the authentication protocols of the port after a pre-determined time from disabling the authentication protocols; and
- reboot the remote network device after installing the authentication credentials on the remote network device.

21. The system of claim 18, further comprising a NAC credential service database configured to store the listing of previously stored remote device identifiers.

22. A non-transient computer readable medium having executable code embodied on the medium for providing instructions for installing Network Access Control (NAC) credentials on a remote network device, comprising:

- computer readable program code configured to enable authentication protocols on a port of an authenticating network switch;
- computer readable program code configured to monitor an authentication failure of the remote network device with invalid authentication credentials connected to the port of the authenticating network switch, wherein the authentication failure is determined after the remote network device connects to the port of the authenticating network switch using invalid credentials;
- computer readable program code to receive the authentication failure and a first remote device identifier;
- computer readable program code configured to validate, by comparing, the first remote device identifier against a listing of previously stored remote device identifiers;
- computer readable program code configured to disable the authentication protocols of the port in response to validating the first remote device identifier;
- computer readable program code configured to install authentication credentials on the remote network device using encrypted data; and
- computer readable program code configured to re-enable the authentication protocols of the port.

23. A method for installing authentication credentials on a remote network device, comprising:

- storing a listing of remote device identifiers into a Network Access Control (NAC) credential service database, wherein the listing of the stored remote device identifiers is entered by a trusted entity;
- connecting the remote network device with invalid authentication credentials to a port of an authenticating network switch, wherein authentication protocols are enabled; authenticating the remote network device with a Remote Authentication Dial-In User Service (RADIUS) server in communication with the authenticating network switch using a network and storing an authentication failure and a first remote device identifier associated with the remote network device;
- validating, by comparing, the first remote device identifier against the list of stored remote device identifiers using the NAC credential service;

disabling the authentication protocols of the port using the NAC credential service in response to validating the first remote device identifier;

validating, by comparing, a second remote device identifier with the listing of stored remote device identifiers using the NAC credential service, wherein the second remote device identifier is received in response to a request from the NAC credential service;

installing authentication credentials and verifying the authentication credentials on the remote network device with the NAC credential service using encrypted data, wherein an untrusted entity cannot view the authentication credentials on the remote network device; rebooting the remote network device, wherein the remote network device is configured to provide authentication credentials to the RADIUS server using the port of the authenticating network switch; and re-enabling the authentication protocols of the port using the NAC credential service.

* * * * *